July 24, 1934.  W. M. GOERLICH  1,967,751
LUBRICATOR FOR CONVEYERS
Filed March 15, 1933
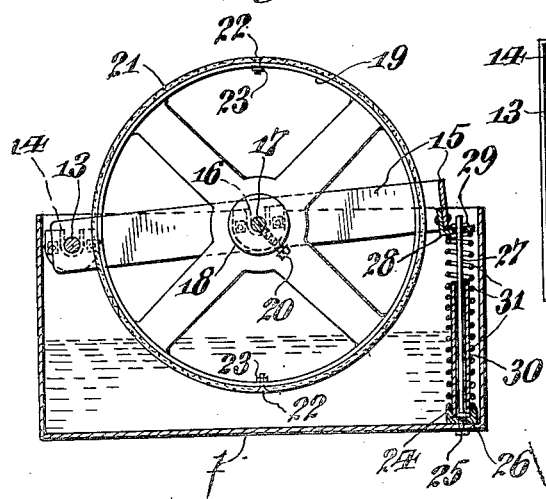
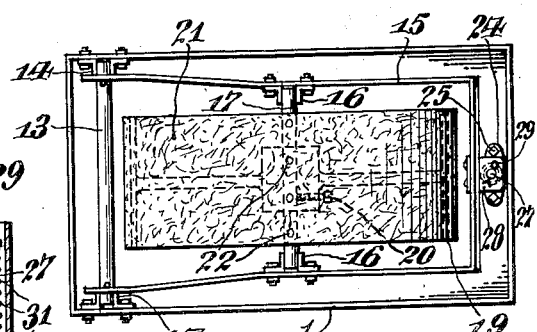
William M. Goerlich,
INVENTOR
BY Victor J. Evans
ATTORNEY Patented July 24, 1934

1,967,751

UNITED STATES PATENT OFFICE 1,967,751

LUBRICATOR FOR CONVEYERS

William M. Goerlich, Philadelphia, Pa., assignor of one-half to N. Herman Rappaport, Camden, N. J.

Application March 15, 1933, Serial No. 660,947

1 Claim. (Cl. 184—15)

The present invention relates to an improved revoluble lubricator for use in connection with endless conveyers or endless chains and the like, the purpose being to provide, in a lubricator of this kind, a revoluble element provided with an absorbent covering, which gathers lubricant from a container and transmits it to an endless conveyer or endless chain or the like.

In transferring the lubricant, the motion of the revoluble element being derived solely through the medium of the weight of the moving conveyer or chain, the chain or conveyer being cleaned at the same time it is being lubricated, due to the fact that the lubricant, when so applied works through the links and pins and then on to the tracks (on which the conveyer or chains slide), thereby lubricating such parts.

Another purpose is to provide, in a lubricator of this kind a yieldably supported revoluble element, such as will accommodate itself to the vibrations of the conveyer or chain during its travel.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawing and claimed.

In the drawing:—

Figure 1 is a vertical longitudinal sectional view through a lubricator, showing a revoluble element yieldably supported, in order that the element may accommodate itself to the vibrations of the conveyer or chain.

Figure 2 is a plan view of Figure 1.

Referring to the drawing 1 identifies a container, which may be any shape and proportions suitable to this type of device.

A shaft 13 is mounted in U shaped bearings 14 bolted or otherwise secured to the opposite side walls of the container 1 at points adjacent one end thereof, and fulcrumed on the shaft 13 is a U shaped frame 15, the sides of which on their inner faces are provided with U shaped bearings 16, in which a shaft 17 is journaled.

A hub 18 of a revoluble element, drum or wheel 19 is made fast by a set screw or bolt 20 to the shaft 17. A band 21 of some suitable absorbent material such as relatively heavy felt is secured by bolts and nuts 22 and 23 to the rim of the revoluble element or wheel 19, and it is designed to gather lubricant from the container 1 and transfer it to an endless conveyer or chain, for lubricating and cleaning same.

A bracket 24 is fastened at 25 to the bottom of the container, and secured in the bracket at 26 is a shaft 27, the upper end of which engages through a bearing bracket 28 carried by said frame 15, there being a cotter pin 29 passing transversely through the upper end of the shaft just above the bearing bracket to prevent the bearing bracket from disengaging the upper end of said shaft. A sleeve 30 is in surrounding relation to the shaft which is secured into the bracket at the bottom of the container, and in surrounding relation to the sleeve is an expansion coil spring 31, the action of which is toward the bracket carried by the frame 15, thereby keeping the bracket on the frame 15 constantly in engagement with the cotter pin which passes through said shaft.

It is obvious that the lubricant is transferred by the absorbent band on the revoluble element to the conveyer or chain, the lubricant passing between the links and the pins, and due to the friction of the conveyer or chain on the absorbent there is created a wiping action which cleans the various parts.

It is also obvious that due to the yieldable mounting of the frame 15 that the revoluble element responds and accommodates itself to the various vibrations of the conveyer or chain during its passage over the revoluble element.

The invention having been set forth, what is claimed is:

In a lubricator as set forth, a container for the reception of lubricant, a shaft journaled in bearings carried by the opposite sides of the container adjacent one end thereof, each bearing having an open side whereby the shaft may be lifted out, a frame pivoted on said shaft, a revoluble element including a shaft journaled in bearings of the sides of the frame, each bearing having an open side whereby the second said shaft may be freely removed, said revoluble element having a relatively broad perimeter including an absorbent band secured thereon adapted to collect lubricant and transmit it to a conveyer or chain passing over the band, a guide rod mounted at one end of the container adjacent the free end of the frame, a guide on the free end of the frame receiving the free end of the guide rod, yieldable means between the guide and where the rod is mounted in the container and associated with the rod to yieldably support the frame, whereby the revoluble element may accommodate itself to the vibrating actions of the conveyer or chain, and means for limiting the downward vibration of the frame.

WILLIAM M. GOERLICH.